(12) United States Patent
Przybycin

(10) Patent No.: US 11,336,868 B2
(45) Date of Patent: *May 17, 2022

(54) DEVICE RECORDING THE COLLISIONS OF FLYING ANIMALS WITH WIND TURBINES AND INDICATING WHERE THEY FELL ON THE GROUND

(71) Applicant: Michal Przybycin, Poznan (PL)

(72) Inventor: Michal Przybycin, Poznan (PL)

( * ) Notice: Subject to any disclaimer, the term of this patent is extended or adjusted under 35 U.S.C. 154(b) by 728 days.

This patent is subject to a terminal disclaimer.

(21) Appl. No.: 16/074,153

(22) PCT Filed: Feb. 8, 2017

(86) PCT No.: PCT/IB2017/050678
§ 371 (c)(1),
(2) Date: Jul. 31, 2018

(87) PCT Pub. No.: WO2017/137899
PCT Pub. Date: Aug. 17, 2017

(65) Prior Publication Data
US 2021/0127094 A1     Apr. 29, 2021

(30) Foreign Application Priority Data
Feb. 13, 2016 (PL) .......................... 416126

(51) Int. Cl.
*H04N 7/18* (2006.01)
*F03D 13/20* (2016.01)
(Continued)

(52) U.S. Cl.
CPC ............. *H04N 7/188* (2013.01); *F03D 13/20* (2016.05); *F03D 80/00* (2016.05); *H04N 5/2253* (2013.01); *H04R 1/028* (2013.01)

(58) Field of Classification Search
CPC ...... H04N 7/188; H04N 5/2253; F03D 13/20; F03D 80/00; H04R 1/028
See application file for complete search history.

(56) References Cited

U.S. PATENT DOCUMENTS

| 9,521,830 B2 * | 12/2016 | Wenger | ..................... G06T 7/20 |
| 2010/0088039 A1 * | 4/2010 | Yang | ....................... C07K 1/14 |
| | | | 702/23 |

(Continued)

FOREIGN PATENT DOCUMENTS

| EP | 2131037 A2 * | 12/2009 | ............. F03D 17/00 |
| EP | 3002455 A1 * | 4/2016 | ............. F03D 17/00 |
| WO | WO-2018081610 A1 * | 5/2018 | |

OTHER PUBLICATIONS

Verhoef J.P. et al. (WT-Bird A Low Cost Solution for Detecting Bird Collisions, ECN-C-04-046, Apr. 2004) (Year: 2004).*

(Continued)

*Primary Examiner* — Richard A Hansell, Jr.
(74) *Attorney, Agent, or Firm* — Craft Chu PLLC; Andrew W. Chu

(57) ABSTRACT

The device recording the collisions of flying animals with wind turbines and indicating where they fell on the ground includes at least two sensors arranged on at least two different heights of the wind turbine tower. The sensors have a range optimally in a direction perpendicular to the wind turbine tower and are connected with the control and recording unit by wire or wireless data transmission.

6 Claims, 4 Drawing Sheets

(51) Int. Cl.
  *F03D 80/00* (2016.01)
  *H04N 5/225* (2006.01)
  *H04R 1/02* (2006.01)

(56) References Cited

U.S. PATENT DOCUMENTS

| | | | | |
|---|---|---|---|---|
| 2011/0192212 | A1* | 8/2011 | Delprat | F03D 17/00 |
| | | | | 73/12.01 |
| 2013/0249218 | A1* | 9/2013 | Vassilev | F03D 80/10 |
| | | | | 290/55 |
| 2015/0010399 | A1* | 1/2015 | Bahat | A01M 29/08 |
| | | | | 416/61 |
| 2016/0055400 | A1* | 2/2016 | Jorquera | F03D 17/00 |
| | | | | 416/61 |
| 2018/0171972 | A1* | 6/2018 | Merz | G05B 13/026 |
| 2018/0230967 | A1* | 8/2018 | Beatrice | F03D 7/028 |
| 2018/0283352 | A1* | 10/2018 | Williams | F03D 7/0288 |

OTHER PUBLICATIONS

Aishwarya et al. "A Survey on Bird Activity Monitoring and Collision Avoidance Techniques in Windmill Turbines", 2016 IEEE International Conference on Technological Innovations in ICT For Agriculture and Rural Development (TIAR 2016) (Year: 2016).*
Hanagasioglu, Mehmet, et al.; Investigation of the effectiveness of bat and bird detection of the DTBat and DTBird systems at Calandawind turbine (Untersuchung zur Effektivität der Fledermaus- und Vogeldetektion der DTBat-und DTBird-Systeme der Calandawind-Turbine), May 15, 2015, p. 7, paragraph 2.2.1.
Pandey, A.; Development of a cost-effective system to monitor wind turbines for bird and bat collisions—phase I sensor system feasibility, Jan. 1, 2006, California Energy Commission, Pier Energy-Related Environmental Research, p. 9, paragraph 4.2.2.
Verhoef, J. P. et al.; WT-Bird, A low cost solution for detecting bird collisions, Jan. 1, 2004, Energy Research Center of the Netherlands, p. 29, paragraph 6.1.
Wiggelinkhuizen, E. J. et al.; Bird collision monitoring system for multi-megawatt wind turbines WT-Bird: Summary of prototype development and testing, Oct. 26, 2006, Energy Research Centre of the Netherlands , p. 10, paragraph 2.5.

* cited by examiner

DEVICE RECORDING THE COLLISIONS OF FLYING ANIMALS WITH WIND TURBINES AND INDICATING WHERE THEY FELL ON THE GROUND

CROSS-REFERENCE TO RELATED APPLICATIONS

See also Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The object of the invention is a device recording the collisions of flying animals with wind turbines and indicating where they fell on the ground.

2. Description of Related Art Including Information Disclosed Under 37 CFR 1.97 and 37 CFR 1.98

A device is disclosed, recording rotor blade of the wind turbines hitting a flying animal, consisting in detecting the acoustic wave generated in the rotor blade as a result of the contact of the blade with a body of an animal (publication US2011192212 Al).

A device is disclosed for recording flying animals with a camera, and on the basis of the recorded image changing the operation of a wind turbine (publication US2013050400 Al). A device is disclosed scanning the image around the wind turbine and turning off the turbine having detected the animals flying in its vicinity (publication JP2009257322 Al).

Of the above-mentioned known solutions, a device of US2011192212 Al allows for precise recording of the number of collisions of a wind turbine with the flying animals. In case of bats, mortality as a result of contact with wind turbines is caused not only by a direct hit by a rotor blade of a wind turbine, but also by barotrauma (damage to the respiratory tract) caused by changes in air pressure in the working area of the wind turbine blade.

BRIEF SUMMARY OF THE INVENTION

The main object of the invention is to provide a device recording all cases of collisions of the flying animals as a result of the contact with the wind turbine also caused by barotrauma, and further to facilitate the location of the animal—the victim of a collision.

The essence of the invention is a device recording the collisions of flying animals with wind turbines and indicating where they fell on the ground, characterized in that it comprises at least two sensors circumferentially arranged on at least two different heights of the wind turbine tower, the sensors being connected with the control and recording unit by wires or wireless data transmission.

Preferably, at least one sensor circuit is mounted at the height of the operating wind turbine rotor.

Preferably, at least one sensor circuit is located inside the wind turbine tower and types of sensors used allow to record the animals outside the wind turbine tower.

Preferably, the sensors are mounted on the mounting bases/brackets in a form other than peripheral.

Preferably, the sensors are mounted directly to the wind turbine tower, without using the mounting bases/brackets.

Preferably, the device additionally comprises at least one video camera and/or night-vision camera and/or infra-red camera and/or camera and/or a detector recording the voices of bats and/or optical indicator and/or loudspeaker, which are mounted on the wind turbine tower and activated by recorded events on at least one sensor in order to additional recording of events. Preferably, at least one additional video camera and/or night-vision camera and/or infra-red camera and/or camera and/or a detector recording the voices of bats and/or optical indicator and/or loudspeaker are mounted on the wind turbine nacelle.

Preferably, the sensors are integrated with more than one control and recording unit.

Preferably, the sensor is provided with a control and recording unit.

Preferably, the device comprises a spray system mounted on a wind turbine tower or a spray system mounted on the wind turbine nacelle or a spray system mounted on the ground in the vicinity of the wind turbine.

DESCRIPTION OF THE FIGURES

Figure 1:
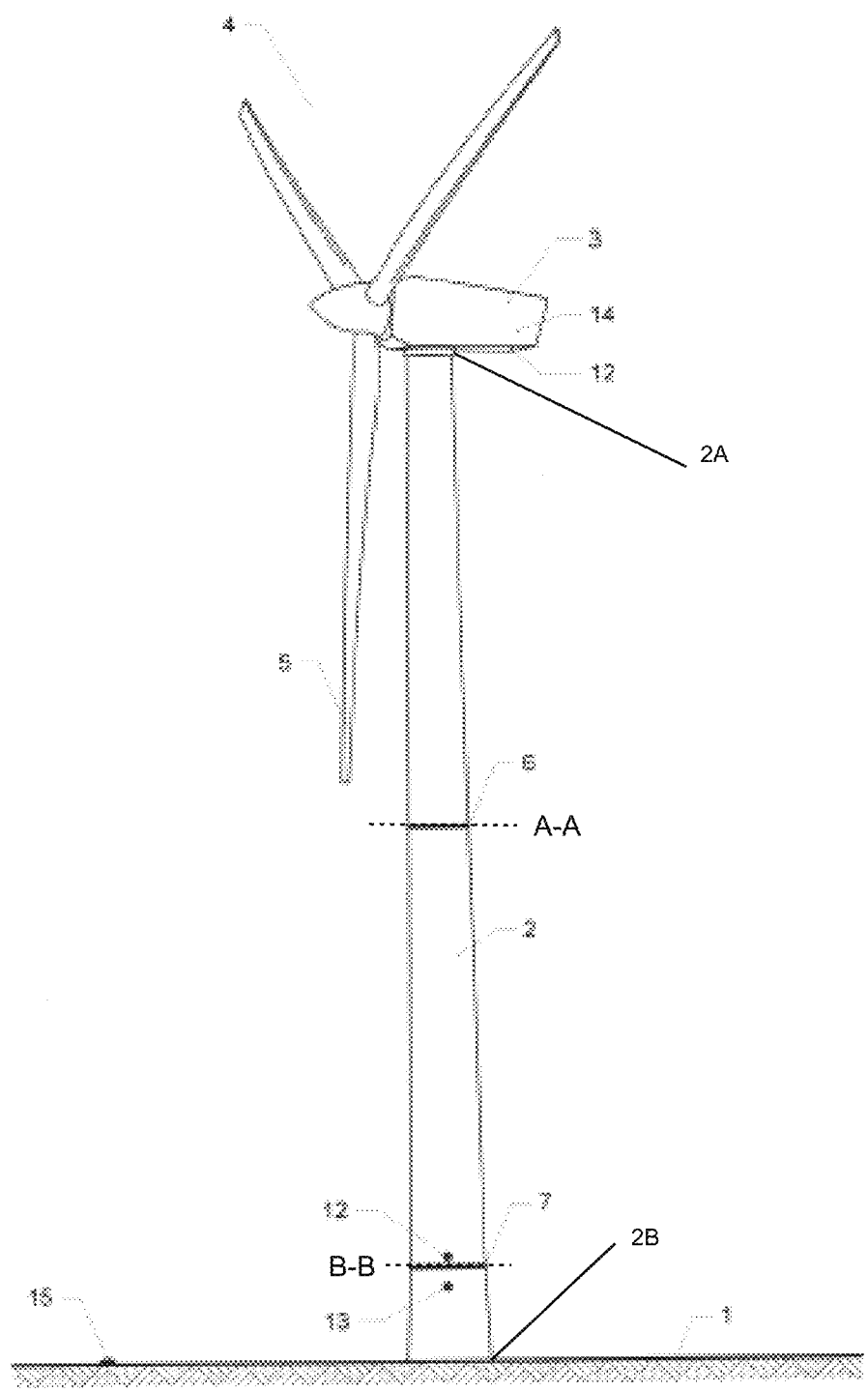
FIG. 1 shows a side elevation view of a wind turbine with a visible location of the elements of the invention.
Figure 2A:
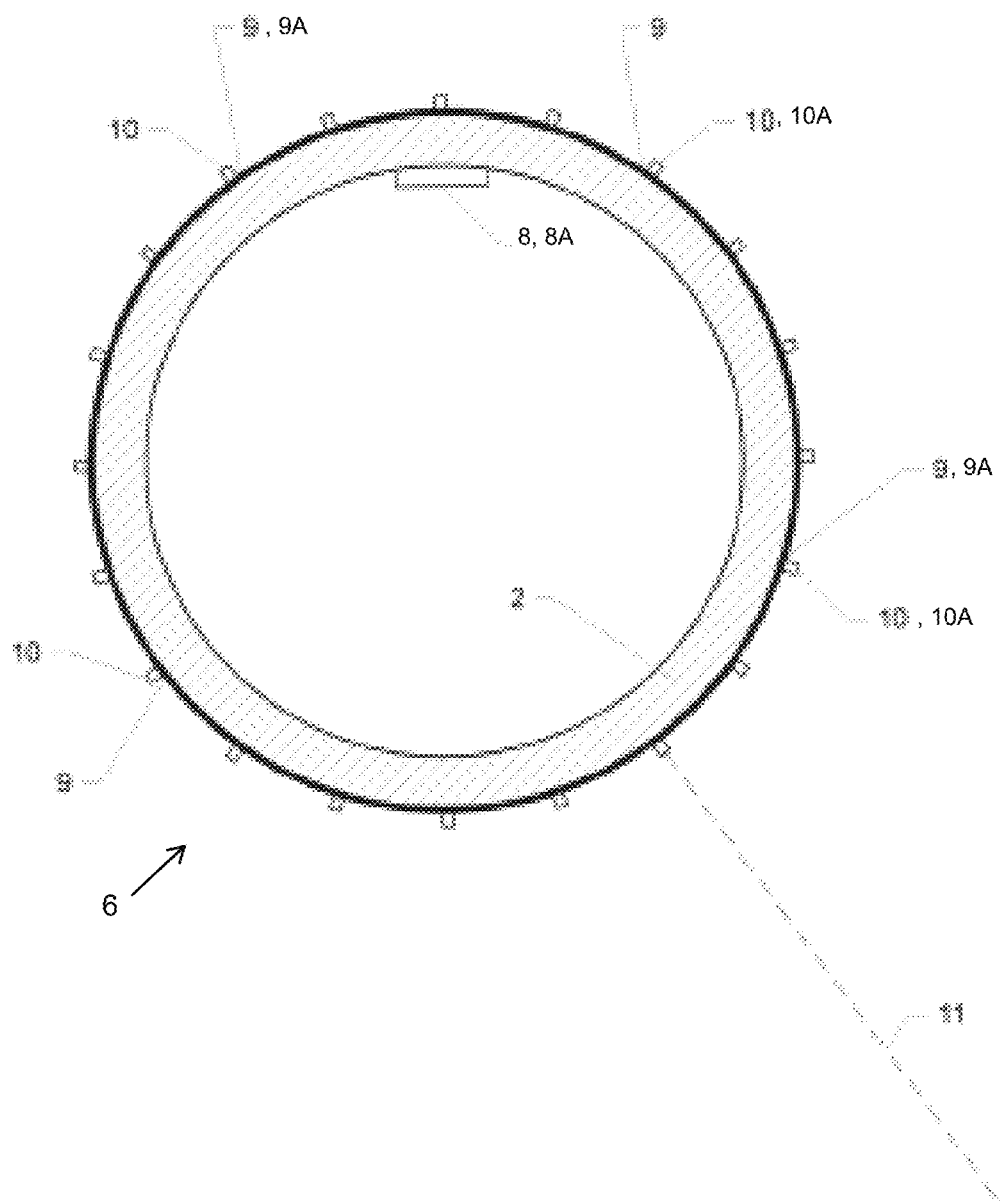
FIG. 2A shows a cross-sectional view across Line A-A in FIG. 1 of the wind turbine tower with a visible first sensor circuit of a first sensor and a control and recording unit of the invention in the elevation of its assembly inside the tower.
Figure 2B:
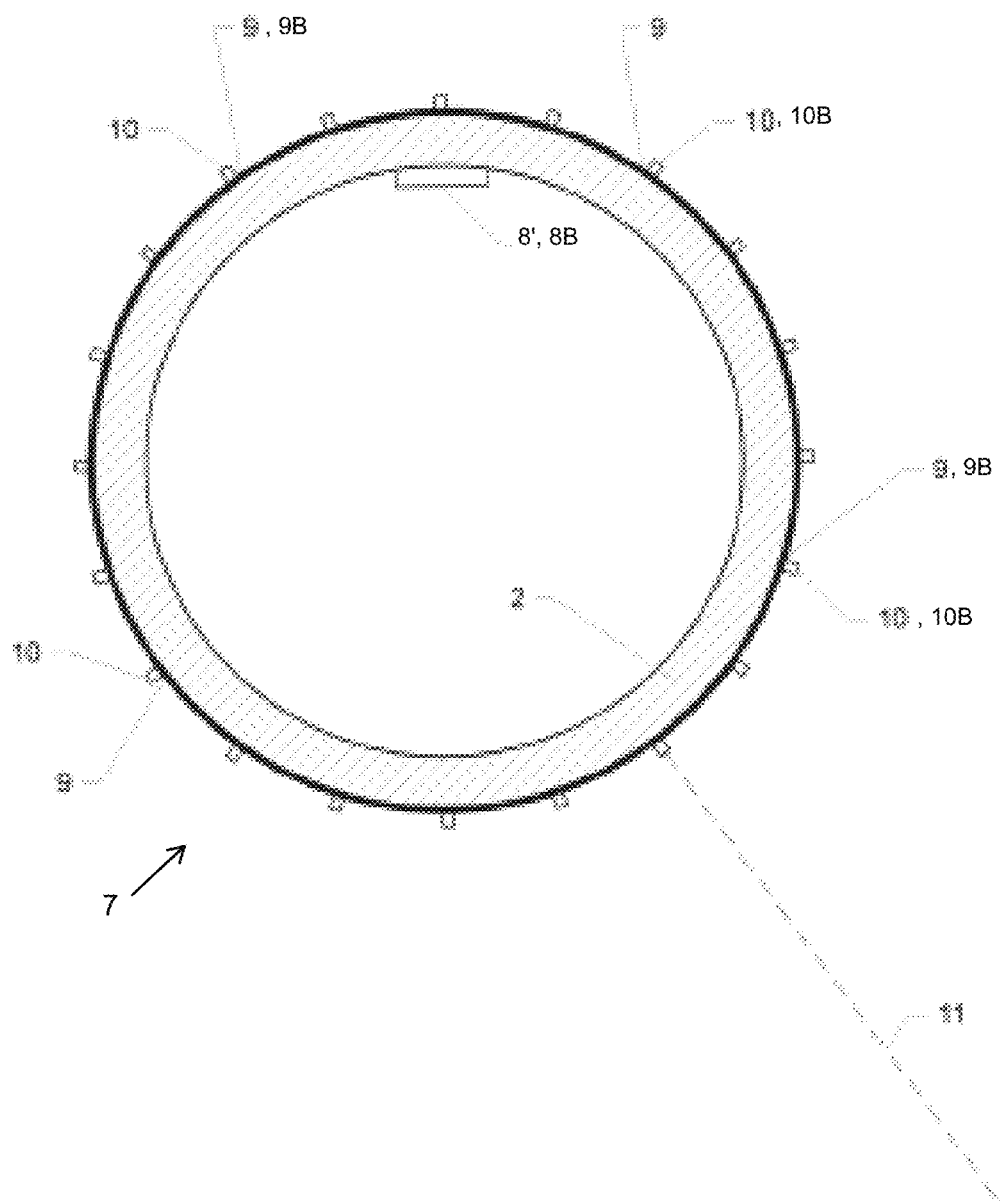
FIG. 2B shows a cross-sectional view across Line B-B in FIG. 1 of the wind turbine tower with a visible second sensor circuit of a second sensor and a control and recording unit of the invention in the elevation of its assembly inside the tower.
Figure 3:
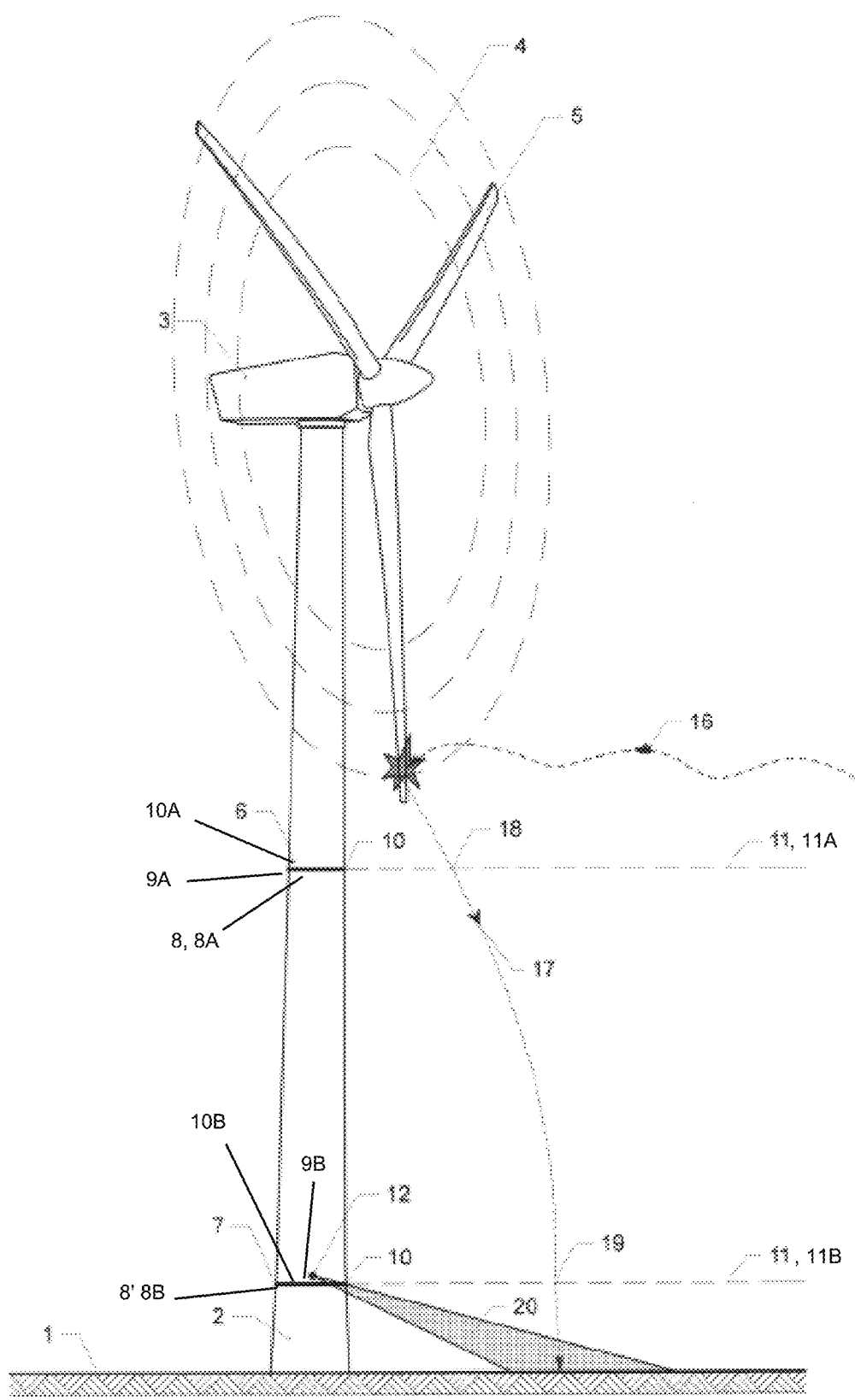
FIG. 3 shows a side elevation view of a wind turbine illustrating the principle of operation of the invention.

1—ground
2—wind turbine tower
3—wind turbine nacelle
4—wind turbine rotor
5—blade of a wind turbine rotor
6—first sensor circuit
7—second sensor circuit
8—control and recording unit 9—mounting base/mounting bracket
10—sensor
11—sensor range
12—video camera and/or night-vision camera and/or infrared camera and/or camera and/or a detector of the voices of bats and/or optical indicator and/or loudspeaker
13—spray system mounted on a tower
14—spray system mounted on a nacelle
15—spray system mounted on the ground
16—live animal (animal before any collision)
17—dead or injured animal (animal after a collision)
18—reading of the event on the first sensor circuit
19—reading of the event on the second sensor circuit
20—recording of the event by 12

DETAILED DESCRIPTION OF THE INVENTION

A device according to the invention consists of at least a first sensor circuit 6 and a second sensor circuit 7 at a first height and a second height, respectively, surrounding the wind turbine tower (2) having a top end 2A and a bottom end 2B. The sensors recording motion (10) (a first sensor 10A, a second sensor 10B) are mounted on the circuits, respectively. There is a control and recording unit (8) (having a first connection means 8A and a second connection means 8B). A single circuit is constituted by a mounting means (9) (such as a first mounting means 9A as a mounting base or direct attachment to the wind turbine tower without a base or bracket, like a hole or cavity, and a second mounting means 9B) as a mounting base or direct attachment to the wind turbine without a base or bracket with respective sensors (10, 10A, 10B) recording motion arranged relative to each other in such a way and in such numbers to encircle the entire recording area with its range (a first range 11A, a second range 11B) defined as a space optimally in a direction preferably and generally perpendicular to the wind turbine tower (2). The range (11) of the sensors (10) in a direction preferably and generally perpendicular to the wind turbine tower (2) optimally should be long enough in order to also record the animals (17) reflected outside the range of the wind turbine rotor (4) operation, preferably in the range of 1.5 to 2.0 times the radius of the wind turbine rotor (4). The term "perpendicular" is interpreted to be substantially perpendicular to one with ordinary skill in the art. The optimal number of circuits (6, 7) in the device according to the invention is two, and their relative positions to each other are to ensure the recording of the direction of the animal flight, victim of a collision (17).

In the most preferred solution of the invention, one circuit is located at the bottom (7) of the wind turbine tower (2) and the other at the top (6) of the wind turbine tower (2). A bottom circuit (7) should be mounted as low as possible, but high enough not to get damaged or dirty, e.g. as a result of field works or storm waves. A top circuit (6) should be mounted as close as possible to the lower position of the blade (5) of the wind turbine rotor (4), but below the range of the blade (5) in such a way that the operation of the blade (5) is not detected by the sensors recording motion (10). The animal killed or injured (17) as a result of the collision with the blade (5) of the wind turbine rotor (4) or as a result of barotrauma caused by falling into the zone of differential pressure, falls towards the ground (1). The device records its fall by a sequence of readings (18, 19) on the sensors (10) of the top circuit (6) and in a short period of time on the sensors (10) of the lower circuit (7). Such a sequence is recorded as a single record and stored in the memory of the control and recording unit (8). In embodiments of the present invention, a wind turbine tower (2) has a top end (2A) and a bottom end (2B) opposite the top end and being comprised of a wind turbine nacelle (3) at the top end (2A) with a rotor (5). There is a first sensor circuit 6 being comprised of a first sensor 10A, a first mounting means 9A, such as a first mounting base, attached to the first sensor and the wind turbine tower, and a first connection means 8A for the first sensor, the first sensor 10A having a first range perpendicular to the wind turbine tower and a first height. There is a second sensor circuit 7 being comprised of a second sensor 10B, a second mounting means 9B, such as a second mounting base, attached to the second sensor and wind turbine the tower, and a second connection means 8B for the second sensor, the second sensor 10B having a second range perpendicular to the wind turbine tower and a second height different from the first height. The first sensor circuit is positioned on the wind turbine tower between wind turbine nacelle 4 and the bottom end. The second sensor circuit is positioned on the wind turbine tower between the first sensor circuit and the bottom end.

There can be at least one control and recording unit (8, 8') connected to the first sensor through the first connection means and the second sensor through the second connection means so as to define a sequence of a first reading 18 relative to the wind turbine tower in the first range by the first sensor and a second reading 19 relative to the wind turbine tower in the second range by the second sensor for mapping so as to read the trajectory and destination fall of the animal. The target location of the animal is determined as an end point of the section formed by the combination of reading (18) on the sensor (10) of the top circuit (6), reading (19) on the sensor (10) of the lower circuit (7) and their extension to the surface of the ground (1). The time of a single sequence is set in the control and recording unit (8) and it should not be longer than the time empirically calculated for the movement of the animal falling from a height equal to the distance between the sensor circuits (6, 7) taking into account an additional time arising from the change of flight direction due to an impact of the blade (5), the parameters of the animal's body, weather conditions, maneuvering of an injured animal. For a given event to be recognized as a record, reading on the sensors (10) of two circuits must occur, first the top (6) one, then the lower (7) one. The reading on the sensors (10) of just one circuit does not give grounds for declaring the event of animal collision with a wind turbine. It is very important because some species of bats and birds (16) during feeding perform diving movements for several, dozen meters.

The effectiveness of the invention will increase with the height of the wind turbine tower (2), because the greater the distance between the top (6) and lower (7) circuit, the smaller the probability of recording of the diving flight of a live animal (16) cutting the recording range (11) of the sensors (10) of both circuits (6, 7). Moreover, the effectiveness will be higher at night when some species of birds are not active (e.g. larks, falcons) who perform a diving flight from a great height, and thus theoretically resulting in erroneous readings.

The circuits (6, 7) of the sensors (10) are connected with a control and recording unit (8) by the first connection means 8A and the second connection means 8B, such as a first and second wired or wireless data transmission, respectively. Reading and transfer of data from the control and recording unit (8) as well as the calibration are possible by means of the wired and wireless transmission. All elements (8, 10, 12, 13, 14, 15) (including a supplemental equipment 12 as a video camera, a night vision camera, an infra-red camera, a camera, a detector recording voices of bats, an optical indicator, or a loudspeaker) as of the device may be powered by batteries or an external power source. It is possible to integrate the operation of the control and recording unit (8) with the wind turbine control system in order to stop the operation of the turbine after recording the critical number of cases of animal mortality recorded at the time.

The sensors (10) used in the device may be of various types e.g. laser, photoelectric optical rangefinders, space scanners, infra-red, video cameras, night-vision cameras, thermal imaging cameras and other meeting a given objective and method of operation of the invention according to the prior art.

I claim:

1. A device, recording a collision of a flying animals, comprising:
   a wind turbine tower having a top end and a bottom end opposite the top end and being comprised of a wind turbine nacelle at said top end and a wind turbine rotor having blades;
   a first sensor circuit being comprised of a first sensor, a first circumferential mounting means for said first sensor to said wind turbine tower, and a first connection means for said first sensor, said first sensor having a first range perpendicular to said wind turbine tower and a first height on said wind turbine tower;
   a second sensor circuit being comprised of a second sensor, a second circumferential mounting means for said second sensor to said wind turbine tower, and a second connection means for said second sensor, said second sensor having a second range perpendicular to said wind turbine tower and a second height on said wind turbine tower,
   wherein said first height is different from said second height,
   wherein said first sensor circuit is positioned on said wind turbine tower between wind turbine nacelle and said bottom end and below said blades, and
   wherein said second sensor circuit is positioned on said wind turbine tower between said first sensor circuit and said bottom end so as to record a first reading of the flying animal after the collision relative to said wind turbine tower in said first range by said first sensor and a second reading of the flying animal after the first reading relative to said wind turbine tower in said second range; and
   a control and recording unit connected to said first sensor through said first connection means and said second sensor through said second connection means so as to define a sequence of said first reading and said second reading between said first height and said second height as a record of the collision and a target location of the flying animal after the collision, after the first reading, and after the second reading.

2. The device, according to claim 1, wherein said wind turbine rotor is at a rotor height on said wind turbine tower, wherein said first height is below said rotor height.

3. The device, according to claim 1, further comprising: supplemental equipment in communication with said control and recording unit,
   wherein said supplemental equipmentis comprised of at least one of a group consisting of a video camera, a night vision camera, an infra-red camera, a camera, a detector recording voices of bats, an optical indicator, and a loudspeaker
   wherein said supplemental equipment is mounted on said wind turbine tower.

4. The device, according to claim 3, wherein said supplemental equipment is mounted on said wind turbine nacelle.

5. The device, according to claim 1, further comprising: another control and recording unit connected to said first sensor through said first connection means and said second sensor through said second connection means.

6. The device, according to claim 5, wherein said control and recording unit is made integral with said first sensor, and wherein said another control and recording unit is made integral with said second sensor.

* * * * *